US012583794B2

(12) United States Patent
Kato et al.

(10) Patent No.: US 12,583,794 B2
(45) Date of Patent: Mar. 24, 2026

(54) ZIRCONIA PRE-SINTERED BODY SUITABLE FOR DENTAL USE

(71) Applicant: KURARAY NORITAKE DENTAL INC., Kurashiki (JP)

(72) Inventors: Shinichiro Kato, Aichi (JP); Yoshihisa Ito, Aichi (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 435 days.

(21) Appl. No.: 17/311,518

(22) PCT Filed: Dec. 26, 2019

(86) PCT No.: PCT/JP2019/051188
§ 371 (c)(1),
(2) Date: Jun. 7, 2021

(87) PCT Pub. No.: WO2020/138316
PCT Pub. Date: Jul. 2, 2020

(65) Prior Publication Data
US 2022/0017423 A1     Jan. 20, 2022

(30) Foreign Application Priority Data

Dec. 27, 2018     (JP) ................................. 2018-245667

(51) Int. Cl.
*C04B 35/48*          (2006.01)
*A61C 13/00*          (2006.01)
(Continued)

(52) U.S. Cl.
CPC .......... *C04B 35/48* (2013.01); *A61C 13/0004* (2013.01); *A61C 13/083* (2013.01);
(Continued)

(58) Field of Classification Search
None
See application file for complete search history.

(56)                    References Cited

U.S. PATENT DOCUMENTS

| | | |
|---|---|---|
| 2013/0190164 A1 | 7/2013 | Ito et al. |
| 2013/0221554 A1 | 8/2013 | Jung et al. |

(Continued)

FOREIGN PATENT DOCUMENTS

| | | |
|---|---|---|
| CN | 102285795 A | 12/2011 |
| EP | 3 517 503 A1 | 7/2019 |

(Continued)

OTHER PUBLICATIONS

Translation—KR20110018652-A; Jeong Chul Woong and Kim Hyun Seung; Feb. 24, 2011 (Year: 2011).*

(Continued)

*Primary Examiner* — Elizabeth Collister
(74) *Attorney, Agent, or Firm* — Oblon, McClelland, Maier & Neustadt, L.L.P.

(57)                    ABSTRACT

The present invention provides a zirconia pre-sintered body that can be fired into a sintered body having translucency and strength suited for dental use (particularly, at the dental clinic), even with a short firing time. The present invention relates to a zirconia pre-sintered body comprising: zirconia; and a stabilizer capable of inhibiting a phase transformation of zirconia, wherein the zirconia predominantly comprises a monoclinic crystal system, and the zirconia pre-sintered body comprises a plurality of layers that differ from each other in the content of the stabilizer relative to the total mole of the zirconia and the stabilizer.

17 Claims, 5 Drawing Sheets

(51) Int. Cl.
   *A61C 13/083*    (2006.01)
   *B28B 11/24*     (2006.01)
   *C04B 35/626*    (2006.01)
   *C04B 35/64*     (2006.01)

(52) U.S. Cl.
   CPC ........ *B28B 11/243* (2013.01); *C04B 35/6262* (2013.01); *C04B 35/64* (2013.01); *C04B 2235/3246* (2013.01); *C04B 2235/6567* (2013.01); *C04B 2235/661* (2013.01); *C04B 2235/762* (2013.01); *C04B 2235/765* (2013.01); *C04B 2235/9653* (2013.01)

(56) References Cited

U.S. PATENT DOCUMENTS

| | | | | |
|---|---|---|---|---|
| 2013/0224454 | A1* | 8/2013 | Jung | ........................ B32B 18/00 264/16 |
| 2015/0173869 | A1* | 6/2015 | Jung | .................... A61C 13/082 264/16 |

| | | | |
|---|---|---|---|
| 2016/0354186 | A1 | 12/2016 | Kim et al. |
| 2020/0317581 | A1 | 10/2020 | Ito |

FOREIGN PATENT DOCUMENTS

| | | | | | |
|---|---|---|---|---|---|
| JP | 2012-41239 | A | | 3/2012 | |
| JP | 2018-51 4245 | A | | 6/2018 | |
| KR | 20110018652 | A | * | 2/2011 | ............ A61K 6/818 |
| WO | WO 2014/181827 | A1 | | 11/2014 | |
| WO | WO 2018/056330 | A1 | | 3/2018 | |
| WO | WO 2018/056331 | A1 | | 3/2018 | |

OTHER PUBLICATIONS

The Zirconia-Yttria System; Pol Duwez, Frank H. Brown, Jr., and Francis Odell; Journal of Electrochemical Society Sep. 1951 98 pp. 356-362 (Year: 1951).*

Extended European Search Report issued on Oct. 12, 2022 in European Patent Application No. 19902009.0, 8 pages.

International Search Report issued on Mar. 17, 2020 in PCT/JP2019/051188 filed on Dec. 26, 2019, 2 pages.

\* cited by examiner

10mm

ZIRCONIA PRE-SINTERED BODY SUITABLE FOR DENTAL USE

TECHNICAL FIELD

The present invention relates to a zirconia pre-sintered body. The present invention also relates to methods for producing a zirconia sintered body and a dental product from the zirconia pre-sintered body.

BACKGROUND ART

Zirconia is a compound that undergoes a phase transformation between crystal systems. Partially stabilized zirconia (PSZ) and fully stabilized zirconia, which are used in a wide variety of fields, inhibit such phase transformations with a stabilizer, such as yttria (yttrium oxide; $Y_2O_3$), dissolved in zirconia as a solid solution.

In dentistry, zirconia materials have been used mostly in frame applications because of their high strength. The improved translucency of more recent zirconia materials has prompted fabrication of dental prostheses solely made of zirconia. Fabrication of all-zirconia dental prostheses is usually performed at dental laboratories. However, it is becoming increasing popular to more conveniently make such dental prostheses at the dental clinic, and this has created growing demand for shortening the firing time of zirconia. Patent Literature 1 discloses a zirconia pre-sintered body that exhibits high translucency even after a short time of firing and is suited for dental use.

Patent Literature 2 discloses a zirconia sintered body with layers containing different amounts of yttria. The amount of yttria decreases from a cervical portion toward a cut end portion of the zirconia sintered body, and this allows the zirconia sintered body to exhibit appropriate translucency as a dental prosthesis.

CITATION LIST

Patent Literatures

Patent Literature 1: WO 2018/056330 A1
Patent Literature 2: US 2013/0221554 A1

SUMMARY OF INVENTION

Technical Problem

As described above, recent years have seen a trend toward more convenient fabrication of zirconia dental prostheses at the dental clinic, and firing of zirconia needs to be completed in a short period of time in such cases. Besides, the resulting zirconia dental prostheses need to be satisfactory in terms of aesthetics (in particular, the translucency at cut end portions thereof) and strength (in particular, the strength at cervical portions thereof).

In the zirconia pre-sintered body disclosed in Patent Literature 1, at least a part of yttria is not dissolved as a solid solution in zirconia. As a result, even with a short firing time (for example, even when the retention time at the highest temperature is 30 minutes), the zirconia pre-sintered body can be fired into a sintered body having translucency roughly equivalent to that achieved under conventional firing conditions (the retention time at the highest temperature is 2 hours). However, this sintered body has translucency and strength that are constant from its cervical portion to cut end portion, and thus cannot satisfy both the translucency required at the cut end portion and the strength required at the cervical portion.

The zirconia disclosed in Patent Literature 2 includes the layers containing different amounts of yttria, and is considered to have appropriate translucency and strength as a dental prosthesis. However, this zirconia needs to be retained at the highest temperature for 2 hours when it is fired, and the firing of this zirconia cannot be completed in a short period of time.

In light of the foregoing, a zirconia pre-sintered body is needed that can be fired into a sintered body having translucency and strength suited for dental use (particularly, at the dental clinic), even with a short firing time.

Solution to Problem

The present inventors conducted intensive studies to find a solution to the foregoing issues, and found that the problems can be solved with a zirconia pre-sintered body that is made of zirconia predominantly comprising a monoclinic crystal system and is provided with layers having different stabilizer contents. The present invention was completed after further studies based on this finding.

Specifically, the present invention includes the following.

[1] A zirconia pre-sintered body comprising:
   zirconia; and
   a stabilizer capable of inhibiting a phase transformation of zirconia, wherein
   the zirconia predominantly comprises a monoclinic crystal system, and
   the zirconia pre-sintered body comprises a plurality of layers that differ from each other in the content of the stabilizer relative to the total mole of the zirconia and the stabilizer.

[2] The zirconia pre-sintered body according to [1], wherein the monoclinic crystal system accounts for at least 55% of the zirconia.

[3] The zirconia pre-sintered body according to [1] or [2], wherein the monoclinic crystal system accounts for at least 75% of the zirconia.

[4] The zirconia pre-sintered body according to any one of [1] to [3], wherein at least a part of the stabilizer is undissolved in the zirconia as a solid solution.

[5] The zirconia pre-sintered body according to any one of [1] to [4], wherein, on a straight line extending along a first direction from one end to the other end of the zirconia pre-sintered body, the content of the stabilizer relative to the total mole of the zirconia and the stabilizer shows unchanging patterns of increase and decrease from the one end toward the other end.

[6] The zirconia pre sintered body according to any one of [1] to [5], wherein the zirconia pre-sintered body has a density of 2.7 to 4.0 $g/cm^3$.

[7] The zirconia pre-sintered body according to any one of [1] to [6], wherein the zirconia pre-sintered body has a flexural strength of 15 to 70 MPa.

[8] The zirconia pre-sintered body according to any one of [1] to [7], wherein the stabilizer is yttria.

[9] The zirconia pre-sintered body according to [8], wherein, on a straight line extending along a first direction from one end to the other end of the zirconia pre-sintered body, the content of the yttria relative to the total mole of the zirconia and the yttria shows unchanging patterns of increase and decrease from the one end toward the other end, the content of the yttria relative to the total mole of the zirconia and the yttria in a layer containing the one end is 4.5 mol % or more and 7.0 mol % or less, and

the content of the yttria relative to the total mole of the zirconia and the yttria in a layer containing the other end is 2.0 mol % or more and less than 4.5 mol %.

[10] The zirconia pre-sintered body according to [8] or [9], wherein, on a straight line extending along a first direction from one end to the other end of the zirconia pre-sintered body, the content of the yttria relative to the total mole of the zirconia and the yttria shows unchanging patterns of increase and decrease from the one end toward the other end, and the difference in the content of the yttria relative to the total mole of the zirconia and the yttria between the layer containing the one end and the layer containing the other end is 4.0 mol % or less.

[11] The zirconia pre-sintered body according to any one of [8] to [10], wherein the zirconia pre-sintered body has an X-ray diffraction pattern with an yttria peak.

[12] The zirconia pre-sintered body according to any one of [8] to [11], wherein the zirconia pre-sintered body has a fraction $f_y$ of more than 0% as calculated from the following mathematical expression (1),

[Math. 1]

$$f_y(\%) = \frac{I_y(111)}{I_y(111) + I_m(111) + I_m(11-1) + I_t(111) + I_c(111)} \times 100 \quad (1)$$

where $I_y(111)$ represents the peak intensity of the (111) plane of the yttria in the vicinity of $2\theta=29°$ in an X-ray diffraction pattern using CuKα radiation, $I_m(111)$ and $I_m(11-1)$ represent the peak intensities of the (111) plane and (11-1) plane, respectively, of the monoclinic crystal system of the zirconia in the X-ray diffraction pattern, $I_t(111)$ represents the peak intensity of the (111) plane of a tetragonal crystal system of the zirconia in the X-ray diffraction pattern, and $I_c(111)$ represents the peak intensity of the (111) plane of a cubic crystal system of the zirconia in the X-ray diffraction pattern.

[13] The zirconia pre-sintered body according to [12], wherein the fraction $f_y$ is 13% or less.

[14] The zirconia pre-sintered body according to [12] or [13], wherein, on a straight line extending along a first direction from one end to the other end of the zirconia pre-sintered body, the content of the yttria relative to the total mole of the zirconia and the yttria shows unchanging patterns of increase and decrease from the one end toward the other end, and a layer containing the one end has a fraction $f_y$ of 1% or more.

[15] The zirconia pre-sintered body according to any one of [12] to [14], wherein, on a straight line extending along a first direction from one end to the other end of the zirconia pre-sintered body, the content of the yttria relative to the total mole of the zirconia and the yttria shows unchanging patterns of increase and decrease from the one end toward the other end, and a layer containing the other end has a fraction $f_y$ of 0.5% or more.

[16] The zirconia pre-sintered body according to any one of [1] to [15], wherein a first sintered body fabricated by firing the zirconia pre-sintered body at a suitable firing temperature for 30 minutes has a first translucency that is at least 85% of a second translucency of a second sintered body fabricated by firing the zirconia pre-sintered body at the suitable firing temperature for 120 minutes.

[17] The zirconia pre-sintered body according to any one of [1] to [16], wherein a first sintered body fabricated by firing the zirconia pre-sintered body at a suitable firing temperature for 15 minutes has a first translucency that is at least 85% of a second translucency of a second sintered body fabricated by firing the zirconia pre-sintered body at the suitable firing temperature for 120 minutes.

[18] A method for producing the zirconia pre-sintered body of any one of [1] to [17], comprising:

pre-sintering at 800° C. to 1,200° C. a zirconia molded body formed from a raw material powder comprising zirconia particles and a stabilizer.

[19] A method for producing a zirconia sintered body comprising:

firing the zirconia pre-sintered body of any one of [1] to [17] at a maximum firing temperature of 1,400° C. to 1,600° C.

[20] The method according to [19], wherein the zirconia pre-sintered body is retained at the maximum firing temperature for less than 120 minutes.

[21] A method for producing a dental product, comprising:

sintering the zirconia pre-sintered body of any one of [1] to [17] after milling the zirconia pre-sintered body.

[22] The method according to [21], wherein the milling is performed using a CAD/CAM system

Advantageous Effects of Invention

The present invention can provide a zirconia pre-sintered body that can be fired into a sintered body having translucency and strength suited for dental use (particularly at the dental clinic), even with a short firing time.

DESCRIPTION OF EMBODIMENTS

Figure 1:
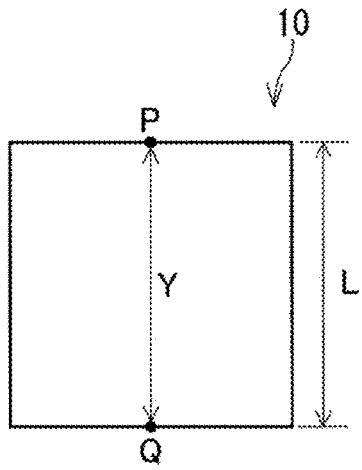
FIG. 1 is a schematic view of a zirconia sintered body.

A zirconia pre sintered body according to the present invention is a zirconia pre-sintered body comprising: zirconia; and a stabilizer capable of inhibiting a phase transformation of zirconia, wherein the zirconia predominantly comprises a monoclinic crystal system, and the zirconia pre-sintered body comprises a plurality of layers that differ from each other in the content of the stabilizer relative to the total mole of the zirconia and the stabilizer.

A zirconia pre-sintered body of the present invention is described below. The zirconia pre-sintered body is a body that can be a precursor (intermediate product) of a zirconia sintered body. In the present invention, the zirconia pre-sintered body may be, for example, a zirconia pre-sintered body that has turned into a block with incompletely sintered zirconia particles (powder). The zirconia pre-sintered body has a density of preferably 2.7 g/cm³ or more. The zirconia pre-sintered body has a density of preferably 4.0 g/cm³ or less, more preferably 3.8 g/cm³ or less, even more preferably 3.6 g/cm³ or less. The zirconia pre-sintered body can be formed with ease when the density is confined within these ranges. The upper and lower limits of the ranges of values (such as the contents of the components, the values calculated from the components, and the values of physical properties) given in this specification can be combined as appropriate.

A zirconia pre-sintered body of the present invention comprises zirconia, and a stabilizer capable of inhibiting a phase transformation of zirconia. The stabilizer is preferably one capable of forming partially stabilized zirconia. Examples of the stabilizer include oxides such as calcium oxide (CaO), magnesium oxide (MgO), yttria, cerium oxide ($CeO_2$), scandium oxide ($SC_2O_3$), niobium oxide ($Nb_2O_5$), lanthanum oxide ($La_2O_3$), erbium oxide ($Er_2O_3$), praseodymium oxide ($Pr_6O_{11}$), samarium oxide ($Sm_2O_3$), europium oxide ($EU_2O$), and thulium oxide ($Tm_2O_3$). Of these, yttria is preferable. The content of the stabilizer in a zirconia pre-sintered body of the present invention and in a sintered body thereof can be measured using a technique, for example, such as inductively coupled plasma (ICP) emission spectral analysis or X-ray fluorescence analysis. The content of the stabilizer in a zirconia pre-sintered body of the present invention and in a sintered body thereof is preferably 0.1 to 18 mol %, more preferably 1 to 15 mol %, even more preferably 1.5 to 10 mol % relative to the total mole of the zirconia and the stabilizer.

In view of achieving translucency and strength suited for dental use (particularly, at the dental clinic), zirconia in a zirconia pre-sintered body of the present invention needs to predominantly comprise a monoclinic crystal system. In the present invention, "predominantly comprising a monoclinic crystal system" means that the fraction $f_m$ of the monoclinic crystal system of zirconia is at least 50% of the total amount of all the crystal systems (monoclinic crystal system, tetragonal crystal system, and cubic crystal system) of the zirconia as calculated from the mathematical expression (2) below. In a zirconia pre sintered body of the present invention, the fraction $f_m$ of the monoclinic crystal system of zirconia relative to the total amount of the monoclinic, tetragonal, and cubic crystal systems in the zirconia as calculated from the mathematical expression (2) below is preferably 55% or more. In view of obtaining more suitable translucency and still higher strength for dental use (particularly, at the dental clinic), the fraction $f_m$ is more preferably 60% or more, even more preferably 70% or more, yet more preferably 75% or more, particularly preferably 80% or more, more particularly preferably 85% or more, most preferably 90% or more. The fraction $f_m$ of the monoclinic crystal system can be calculated from the mathematical expression (2) below, using peaks in an X-ray diffraction (XRD) pattern by CuKα radiation. The predominant crystal system in the zirconia pre-sintered body is considered to be a factor that serves to raise the shrinkage temperature and to shorten the firing time.

In a zirconia pre-sintered body of the present invention, the peaks of tetragonal and cubic crystal systems may be essentially undetectable. That is, the monoclinic crystal system may have a fraction $f_m$ of 100%.

[Math. 2]

$$f_m(\%) = \frac{I_m(111) + I_m(11-1)}{I_m(111) + I_m(11-1) + I_t(111) + I_c(111)} \times 100 \qquad (2)$$

In the mathematical expression (2), $I_m(111)$ and $I_m(11\text{-}1)$ represent the peak intensities of the (111) plane and (11-1) plane, respectively, of the monoclinic crystal system of zirconia. $I_t(111)$ represents the peak intensity of the (111) plane of the tetragonal crystal system of zirconia. $I_c(111)$ represents the peak intensity of the (111) plane of the cubic crystal system of zirconia.

In a zirconia pre-sintered body of the present invention, it is preferable that at least a part of the zirconia crystals exist as monoclinic crystals by the presence of the stabilizer. To be more specific, it is preferable that at least a part of the stabilizer be present in an undissolved form in the zirconia as a solid solution. Whether a part of the stabilizer is undissolved in the zirconia as a solid solution can be determined by analyzing an XRD pattern, for example. The presence of a peak derived from the stabilizer in the XRD pattern of the zirconia pre-sintered body means that at least a part of the stabilizer is present in an undissolved form in the zirconia as a solid solution in the zirconia pre-sintered body. A peak derived from the stabilizer is basically not observable in the XRD pattern when the stabilizer has fully been dissolved as a solid solution. It is, however, possible, depending on the crystal state or other conditions of the stabilizer, that the stabilizer may not be dissolved in zirconia as a solid solution even when the stabilizer does not produce a peak in the XRD pattern. When the crystal system of zirconia is predominantly tetragonal and/or cubical and there is no peak attributed to the stabilizer in the XRD pattern, the stabilizer can be thought of having been dissolved in zirconia as a solid solution for the most part, basically completely. In a zirconia pre-sintered body of the present invention, it is not required to fully dissolve the stabilizer in the zirconia as a solid solution. In the present invention, "to dissolve the stabilizer as a solid solution" means that, for example, the elements (atoms) contained in the stabilizer are dissolved in the zirconia as a solid solution.

In a zirconia pre-sintered body of the present invention, it is preferable in view of achieving translucency and strength suited for dental use (particularly, at the dental clinic) that, on a straight line extending along a first direction from one end to the other end of the zirconia pre-sintered body, the fraction $f_m$ of the monoclinic crystal system of the zirconia as calculated from the mathematical expression (2) show unchanging patterns of increase and decrease from the one end toward the other end. In other words, it is preferable that the fraction $f_m$ of the monoclinic crystal system of zirconia monotonically increase or decrease. This is described below with reference to FIG. 1, which is a schematic view of a zirconia pre-sintered body. FIG. 1 shows a zirconia pre sintered body 10 with a straight line extending along a first direction Y from one end P to the other end Q. Preferably, the pattern of increase or decrease of the fraction $f_m$ of the monoclinic crystal system of zirconia does not change in the opposite direction on such a straight line. Specifically, when the fraction $f_m$ of the monoclinic crystal system of the zirconia is in a pattern of decrease on a straight line from one end P to the other end Q, it is preferable that there exist no interval in which the fraction $f_m$ essentially increases. In a certain embodiment, in view of achieving translucency and strength suited for dental use (particularly, at the dental clinic) in relation to the stabilizer content, the fraction $f_m$ of the monoclinic crystal system of the zirconia preferably is in a pattern of increase on a straight line from one end P to the other end Q when the stabilizer content is in a pattern of decrease on the straight line from one end P to the other end Q.

A zirconia pre-sintered body of the present invention includes a plurality of layers that differ from each other in the content of the stabilizer relative to the total mole of the zirconia and the stabilizer. By providing a zirconia pre sintered body with layers having different stabilizer contents as shown in, for example, FIG. 3B, it becomes possible to appropriately set the translucency and strength required for each portion (layer) of a zirconia sintered body obtained from the zirconia pre-sintered body, while the zirconia pre sintered body is made of a single material. The thickness of each layer is not limited to any particular thickness, and may be about 0.5 mm to 3 cm.

In a zirconia pre-sintered body of the present invention, in view of achieving translucency and strength suited for dental use, it is preferable that, on a straight line extending along the first direction from one end to the other end of the zirconia pre-sintered body, the content of the stabilizer (preferably, yttria) relative to the total mole of the zirconia and the stabilizer show unchanging patterns of increase and decrease from the one end toward the other end. In other words, it is preferable that the content of the stabilizer (preferably, yttria) monotonically increase or decrease. This is described below with reference to the schematic view of the zirconia pre-sintered body in FIG. 1. Preferably, on a straight line extending along the first direction Y from one end P to the other end Q in the zirconia pre-sintered body 10 shown in FIG. 1, the pattern of increase or decrease of the stabilizer content does not change in the opposite direction. Specifically, when the stabilizer content is in a pattern of decrease on a straight line from one end P to the other end Q, it is preferable that there exist no interval in which the stabilizer content essentially increases.

The stabilizer is preferably yttria in view of the strength and translucency of a zirconia sintered body fabricated from a zirconia pre-sintered body of the present invention. The yttria content relative to the total mole of zirconia and yttria in a layer containing one end P of the zirconia pre-sintered body 10 shown in FIG. 1 is preferably 4.5 mol % or more, more preferably 4.7 mol % or more, even more preferably 4.8 mol % or more, particularly preferably 5.0 mol % or more, and is preferably 7.0 mol % or less, more preferably 6.5 mol % or less, even more preferably 6.2 mol % or less, particularly preferably 6.0 mol % or less. When the yttria content in this layer is 4.5 mol % or more and 7.0 mol % or less, the zirconia sintered body can have increased translu cency, and such translucency is suited as the translucency of a cut end portion of a dental prosthesis. The yttria content relative to the total mole of zirconia and yttria in the layer containing the other end Q of the zirconia pre-sintered body 10 is preferably 2.0 mol % or more, more preferably 2.5 mol % or more, even more preferably 2.8 mol % or more, particularly preferably 3.0 mol % or more, and is preferably less than 4.5 mol %, more preferably 4.2 mol % or less, even more preferably 4.1 mol % or less, particularly preferably 4.0 mol % or less. When the yttria content in this layer is 2.0 mol % or more and less than 4.5 mol %, the zirconia sintered body can have increased strength, and such strength is suited as the strength of a cervical portion of a dental prosthesis. Besides, when the yttria content is 2.0 mol % or more and less than 4.5 mol %, the translucency is not excessively high, and such translucency is suited as the translucency of a cervical portion of a dental prosthesis. A zirconia pre-sintered body of the present invention may include, between the layer containing one end P and the layer containing the other end Q, at least one layer with an yttria content that is different from the yttria contents in the layer containing one end P and the layer containing the other end Q. This allows the zirconia sintered body to have translucency changing gradually between its cervical portion and cut end portion, and the zirconia sintered body can have translucency similar to that of a natural tooth. In a zirconia pre-sintered body according to the present invention, it is more preferable that, on the straight line extending along the first direction from one end to the other end of the zirconia pre-sintered body, the yttria content relative to the total mole of the zirconia and the yttria show unchanging patterns of increase and decrease from the one end toward the other end, and that the yttria contents in the respective layers fall within predetermined ranges.

The difference in the yttria content relative to the total mole of the zirconia and the yttria between the layer con taining one end P and the layer containing the other end Q in the zirconia pre-sintered body 10 is preferably 4.0 mol % or less, more preferably 3.5 mol % or less, even more preferably 3.0 mol % or less. The difference in the yttria content is preferably 0.3 mol % or more, more preferably 0.5 mol % or more, even more preferably 1.0 mol % or more. When the difference in the yttria content between the layer containing one end P and the layer containing the other end Q in the zirconia pre-sintered body 10 is 4.0 mol % or less, the difference in the translucency between a cut end portion and a cervical portion of a dental prostheses fabricated from the zirconia pre-sintered body 10 is not excessively large, and the dental prostheses can exhibit translucency appropri ate for its use. In addition, when the difference in the yttria content is 4.0 mol % or less, the difference in the firing shrinkage ratio between the layer containing one end P and the layer containing the other end Q can fall within 0.5%, whereby the occurrence of cracking and deformation can be prevented during the fabrication of a dental prostheses from the zirconia pre-sintered body 10. When at least one layer with an yttria content that is different from the yttria contents in the layer containing one end P and the layer containing the other end Q is present between the layer containing one end P and the layer containing the other end Q, the different in the yttria content between each pair of adjacent layers is preferably 3.0 mol % or less, more preferably 2.5 mol % or less, even more preferably 2.0 mol % or less. The difference in the yttria content is preferably 0.1 mol % or more, more preferably 0.3 mol % or more, even more preferably 0.5 mol % or more.

In a zirconia pre-sintered body of the present invention, the percentage presence $f_y$ of yttria not dissolved in zirconia as a solid solution (hereinafter, referred to also as "undis-solved yttria") can be calculated from the mathematical expression (1) below.

[Math. 3]

$$f_y(\%) = \frac{I_y(111)}{I_y(111) + I_m(111) + I_m(11-1) + I_t(111) + I_c(111)} \times 100 \quad (1)$$

In the mathematical expression (1), $I_y(111)$ represents the peak intensity of the (111) plane of yttria in the vicinity of $2\theta=29°$ in an XRD pattern using CuKα radiation. $I_m(111)$ and $I_m(11-1)$ represent the peak intensities of the (111) plane and (11-1) plane, respectively, of the monoclinic crystal system of the zirconia. $I_t(111)$ represents the peak intensity of the (111) plane of the tetragonal crystal system of the zirconia. $I_c(111)$ represents the peak intensity of the (111) plane of the cubic crystal system of the zirconia.

In view of obtaining more suitable translucency and still higher strength for dental use (particularly, at the dental clinic), the percentage presence $f_y$ of undissolved yttria in a zirconia pre-sintered body of the present invention is preferably more than 0%, more preferably 1% or more, even more preferably 2% or more. The upper limit of the percentage presence $f_y$ of undissolved yttria may be, for example, 13% or less. Preferably, the upper limit of the percentage presence $f_y$ of undissolved yttria is determined depending on the yttria content in the zirconia pre-sintered body. In the layer containing one end P of the zirconia pre-sintered body 10 shown in FIG. 1, i.e., in the layer having an yttria content of 4.5 mol % or more and 6.5 mol % or less, the percentage presence $f_y$ can be set to 13% or less. In the layer containing the other end Q of the zirconia pre-sintered body 10 shown in FIG. 1, i.e., in the layer having an yttria content of 2.5 mol % or more and less than 4.5 mol %, the percentage presence $f_y$ can be set to 7% or less. In the layer containing one end P of the zirconia pre-sintered body 10 shown in FIG. 1, i.e., in the layer having an yttria content of 4.5 mol % or more and 6.5 mol % or less, the percentage presence $f_y$ is preferably 1% or more, more preferably 2% or more, even more preferably 3% or more. In the layer containing the other end Q of the zirconia pre-sintered body 10 shown in FIG. 1, that is, in the layer having an yttria content of 2.5 mol % or more and less than 4.5 mol %, the percentage presence $f_y$ is preferably 0.5% or more, more preferably 1% or more, and even more preferably 2% or more.

It should be noted that the mathematical expression (1) is also applicable to calculations of the percentage presence of undissolved stabilizers other than yttria as a solid solution by substituting other peaks for $I_y(111)$.

In a zirconia pre-sintered body of the present invention, it is preferable in view of achieving translucency and strength suited for dental use (particularly, at the dental clinic) that, on a straight line extending along the first direction from one end to the other end of the zirconia pre sintered body, the percentage presence $f_y$ of undissolved yttria as calculated from the mathematical expression (1) show unchanging patterns of increase and decrease from the one end toward the other end. In other words, it is preferable that the percentage presence $f_y$ of undissolved yttria in the zirconia pre sintered body monotonically increase or decrease. This is described below with reference to the schematic view of the zirconia pre-sintered body in FIG. 1. Preferably, on a straight line extending along the first direction Y from one end P to the other end Q in the zirconia pre-sintered body 10 shown in FIG. 1, the pattern of increase or decrease of the percentage presence $f_y$ of undissolved yttria in the zirconia pre-sintered body does not change in the opposite direction. Specifically, when the percentage presence $f_y$ of undissolved yttria in the zirconia pre-sintered body is in a pattern of decrease on a straight line from one end P to the other end Q, it is preferable that there exist no interval in which the percentage presence $f_y$ of undissolved yttria essentially increases. In a certain embodiment, in view of achieving translucency and strength suited for dental use (particularly, at the dental clinic) in relation to the content of the stabilizer, the fraction $f_m$ of the monoclinic crystal system of the zirconia preferably is in a pattern of increase on a straight line from one end P to the other end Q when the percentage presence $f_y$ of undissolved yttria in the zirconia pre sintered body is in a pattern of decrease on the straight line from one end P to the other end Q.

Concerning the foregoing descriptions given with reference to the schematic view shown in FIG. 1, it is preferable in the present invention that "one end" and "the other end" refer to a point at the cut end and a point at the base end of a zirconia pre-sintered body or a sintered body thereof, for example, when the zirconia pre-sintered body or the sintered body has a crown shape. The point may be a point on the end surface, or a point on a cross section.

When the zirconia pre-sintered body is disc-shaped, or has a shape of a hexahedron such as a cuboid, "one end" and "the other end" preferably refer to points on the top surface and bottom surface (base). The point may be a point on the end surface, or a point on a cross section.

In the present invention, "first direction from one end to the other end" means a direction in which the yttria content changes. For example, "first direction" is preferably the direction of powder lamination in the method of production described below. For example, when the zirconia pre-sintered body has a crown shape, "first direction" is preferably a direction connecting the cut end side and the cervical side.

In order to ensure the strength needed for mechanical working, a zirconia pre-sintered body of the present invention has a flexural strength of preferably 15 MPa or more. For ease of mechanical working, the flexural strength of the pre-sintered body is preferably 70 MPa or less, more preferably 60 MPa or less.

The flexural strength can be measured in compliance with ISO 6872:2015, and the measurement is made using the same conditions, except for the specimen size, specifically, by using a specimen measuring 5 mm×10 mm×50 mm in size. The surface of the specimen, and the C surface are longitudinally finished with #600 sandpaper. The specimen is disposed in such an orientation that the widest surface is vertically situated (loading direction). In the flexural measurement, the span is 30 mm, and the crosshead speed is 0.5 mm/min.

A zirconia pre sintered body of the present invention may comprise an additive(s) in addition to the zirconia and the stabilizer, provided that the present invention can exhibit its effects. Examples of the additive include colorants (including pigments, complex pigments, and fluorescent agents), alumina ($Al_2O_3$), titanium oxide ($TiO_2$), and silica ($SiO_2$).

Examples of the pigments include oxides of at least one element selected from the group consisting of Ti, V, Cr, Mn, Fe, Co, Ni, Zn, Y, Zr, Sn, Sb, Bi, Ce, Pr, Sm, Eu, Gd, Tb, and Er. Examples of the complex pigments include $(Zr,V)O_2$, $Fe(Fe,Cr)_2O_4$, $(Ni,Co,Fe)(Fe,Cr)_2O_4ZrSiO_4$, and $(Co,Zn)Al_2O_4$. Examples of the fluorescent agents include $Y_2SiO_5$:Ce, $Y_2SiO_5$:Tb, $(Y,Gd,Eu)BO_3$, $Y_2O_3$:Eu, YAG:Ce, $ZnGa_2O_4$:Zn, and $BaMgAl_{10}O_{17}$:Eu.

A zirconia pre-sintered body of the present invention can be produced by a method whereby a zirconia molded body made from a raw material powder containing zirconia particles and a stabilizer is fired (i.e., pre-sintered) at a temperature that does not sinter the zirconia particles (pre-sintering step). The zirconia molded body is not limited to any particular one, and can be produced using a raw material powder containing zirconia particles and a stabilizer by a known method (for example, press forming). In order to ensure formation of a block, the firing temperature for pre-sintering is, for example, preferably 800° C. or more, more preferably 900° C. or more, even more preferably 950° C. or more. For improved dimensional accuracy, the firing temperature is, for example, preferably 1,200° C. or less, more preferably 1,150° C. or less, even more preferably 1,100° C. or less. That is, the firing temperature is preferably 800° C. to 1,200° C. in a method of production of a zirconia pre sintered body of the present invention. Firing should not drive the dissolution of the stabilizer as a solid solution with the firing temperature falling in this range.

A zirconia pre-sintered body of the present invention may be a molded body of a predetermined shape. For example, the zirconia pre sintered body may be disc-shaped (circular disc) or cuboidal, or may have a shape of a dental product (for example, a shape of a crown). The pre sintered body is also inclusive of a dental product (for example, a crown-shaped prosthesis) made from a pre-sintered zirconia disc by processing with a CAD/CAM (Computer-Aided Design/Computer Aided Manufacturing) system.

A zirconia pre sintered body of the present invention can be fabricated into a high-translucency sintered body even with a short firing time. A sintered body fabricated by firing a zirconia pre-sintered body of the present invention at a suitable firing temperature for a certain time period is denoted herein as a first sintered body. A sintered body fabricated by firing a zirconia pre sintered body of the present invention at the suitable firing temperature for 120 minutes is denoted herein as a second sintered body. In a comparison of the translucency of the first sintered body and the second sintered body, the translucency of a first sintered body with 30-minute firing is preferably at least 85%, more preferably at least 90%, even more preferably at least 95% of the translucency of the second sintered body, particularly preferably essentially the same as the translucency of the second sintered body. The translucency of a first sintered body with 15-minute firing is preferably at least 85%, more preferably at least 90%, even more preferably at least 95% of the translucency of the second sintered body, particularly preferably essentially the same as the translucency of the second sintered body. As hereinbefore described, a zirconia pre-sintered body of the present invention has the time advantage for firing. Details of translucency and the suitable firing temperature of the present invention, including the evaluation methods, will be described in the EXAMPLES section below.

A zirconia sintered body of the present invention is described below. A zirconia sintered body of the present invention can be described as, for example, zirconia particles (powders) that have been sintered. Specifically, a zirconia sintered body of the present invention is a zirconia sintered body fabricated from a zirconia pre sintered body of the present invention. The zirconia sintered body has a relative density of preferably 99.5% or more. The relative density can be calculated as a fraction of the actual density measured by the Archimedes method relative to the theoretical density.

A zirconia sintered body of the present invention includes not only sintered bodies produced by sintering molded zirconia particles under ordinary pressure or no applied pressure, but sintered bodies that have been densified by a high-temperature pressure process such as hot isostatic pressing (HIP).

The zirconia and stabilizer contents in a zirconia sintered body of the present invention are essentially the same as the zirconia and stabilizer contents in a pre-sintered body before being fabricated into the sintered body. Concerning the crystal systems of zirconia in the zirconia sintered body, the fraction $f_m$ of the monoclinic crystal system is preferably 10% or less, more preferably 5% or less, even more preferably 0% (the monoclinic crystal system is essentially non-existent). The crystal systems other than the monoclinic crystal system are tetragonal and/or cubic crystal systems.

Concerning the fraction of the solid solution of the stabilizer in a zirconia sintered body of the present invention, it is preferable that at least 95% of the stabilizer contained be dissolved in zirconia as a solid solution. More preferably, the stabilizer is dissolved as a solid solution essentially entirely. That is, the percentage presence $f_y$ of undissolved yttria is preferably 5% or less, more preferably 1% or less, even more preferably 0% (yttria is dissolved as a solid solution essentially entirely). The dissolution of the stabilizer (for example, yttria) in zirconia as a solid solution probably takes place in the sintering step to be described below.

A method for producing a zirconia sintered body of the present invention is described below. A zirconia sintered body of the present invention can be fabricated by firing a zirconia pre sintered body at a temperature that sinters the zirconia particles (sintering step). The firing temperature in the sintering step is, for example, preferably 1,400° C. or more, more preferably 1,450° C. or more. The firing temperature is, for example, preferably 1,650° C. or less, more preferably 1,600° C. or less. The rate of temperature increase and the rate of temperature decrease are preferably 300° C./min or less. That is, in a method for producing a zirconia sintered body of the present invention, the zirconia pre-sintered body is preferably fired at a maximum firing temperature of 1,400° C. to 1,650° C. The suitable firing temperature of a zirconia pre-sintered body may be the maximum firing temperature.

In the sintering step, the retention time at a temperature that can cause sintering (for example, the maximum firing temperature) is preferably less than 120 minutes, more preferably 90 minutes or less, even more preferably 75 minutes or less, yet more preferably 60 minutes or less, particularly preferably 45 minutes or less, most preferably 30 minutes or less. The retention time may be 25 minutes or less, 20 minutes or less, or 15 minutes or less. The retention time is preferably 1 minute or more, more preferably 5 minutes or more, even more preferably 10 minutes or more. A zirconia pre-sintered body of the present invention can suppress decrease of translucency in the zirconia sintered body fabricated therefrom even with such a short firing time. With a short firing time, it is also possible to increase production efficiency, and reduce the cost of energy.

Preferably, the rate of temperature increase and the rate of temperature decrease in the sintering step are set to reduce the time required for the sintering step. For example, the rate of temperature increase may be set so that the temperature reaches the maximum firing temperature as short a time period as the performance of the firing furnace allows. The rate of temperature increase to the maximum firing temperature may be, for example, 10° C./min or more, 50° C./min or more, 100° C./min or more, 120° C./min or more, 150° C./min or more, or 200° C./min or more. The rate of temperature decrease is preferably set at a rate that does not cause defects such as cracking in the sintered body. For example, the sintered body may be allowed to cool at room temperature after the completion of heating. Here, "maximum firing temperature" means the highest temperature reached in the sintering step.

A zirconia sintered body obtained by firing the zirconia pre-sintered body of the present invention can be suitably used as a dental product. Examples of such a dental product include copings, frameworks, crowns, crown bridges, abutments, implants, implant screws, implant fixtures, implant bridges, implant bars, brackets, denture bases, inlays, onlays, orthodontic wires, and laminate veneers. Such a dental product may be produced by selecting a method suited for its intended use. For example, a dental product can be obtained by sintering a zirconia pre sintered body of the present invention after milling the zirconia pre-sintered body. Preferably, the milling is performed using a CAD/CAM system.

The present invention encompasses combinations of the foregoing features, provided that such combinations made in various forms within the technical idea of the present invention can produce the effects of the present invention.

EXAMPLES

The following describes the present invention in greater detail by way of Examples. It should be noted that the present invention is in no way limited by the following Examples, and various changes may be made by a person with ordinary skill in the art within the technical idea of the present invention.

Examples 1 to 5 and Comparative Examples 1 to 3

Fabrication of Zirconia Pre-Sintered Body

In Examples and Comparative Examples, zirconia pre-sintered bodies were fabricated using the following procedures.

Raw material powder used to produce zirconia pre-sintered bodies of Examples 1 to 5 and Comparative Examples 1 and 2 was prepared in the following manner. First, mixtures with yttria contents relative to the total mole of zirconia and yttria as shown in Table 1 were prepared using a monoclinic zirconia powder and an yttria powder. Next, each mixture was added to water to prepare a slurry, and pulverized and mixed wet with a ball mill until an average particle diameter of 0.13 μm or less was achieved. After pulverization, the slurry was dried with a spray dryer, and the resulting powder was fired at 950° C. for 2 hours to prepare a primary powder. The average particle diameter can be determined by using a laser diffraction scattering method. Specifically, for the measurement using a laser diffraction scattering method, for example, a laser diffraction particle size analyzer (SALD-2300, manufactured by Shimadzu Corporation) may be used with a 0.2% sodium hexametaphosphate aqueous solution used as dispersion medium.

The thus-obtained primary powder was added to water to prepare a slurry, and the slurry was pulverized and mixed wet with a ball mill until an average particle diameter of 0.13 μm or less was achieved. After pulverization, a binder was added to the slurry, and the resulting mixture was dried with a spray dryer to prepare a secondary power. Zirconia pre sintered bodies to be described below were produced using the thus-obtained respective secondary powers as the raw material powders.

A zirconia pre-sintered body of Comparative Example 3 was produced using Zpex® Smile manufactured by Tosoh Corporation as a raw material powder for forming a first layer and Zpex® manufactured by Tosoh Corporation as a raw material powder for forming a second layer.

A method for producing each zirconia pre-sintered body is described below. First, the raw material powders were charged into a die having inside dimensions of 20 mm×25 mm in the order shown in Table 1, and were subjected to primary pressing at a surface pressure of 300 kg/cm² for 90 seconds, using a uniaxial pressing machine. The resulting primary press-molded body was formed into a molded body with a layered structure by CIP at 1,700 kg/cm² for 5 minutes. In Example 1 and Comparative Example 3, molded bodies with a two-layer structure were formed by charging 15 g of the raw material powders to form the respective layers. In Examples 2 to 5, molded bodies with a three layer structure were formed by charging 10 g of the raw material powders to form the respective layers. In Comparative Examples 1 and 2, molded bodies with a single-layer structure were formed by charging 30 g of the raw material powder. The thus-obtained molded bodies were fired at 1,000° C. for 2 hours to prepare zirconia pre sintered bodies.

Figure 2:
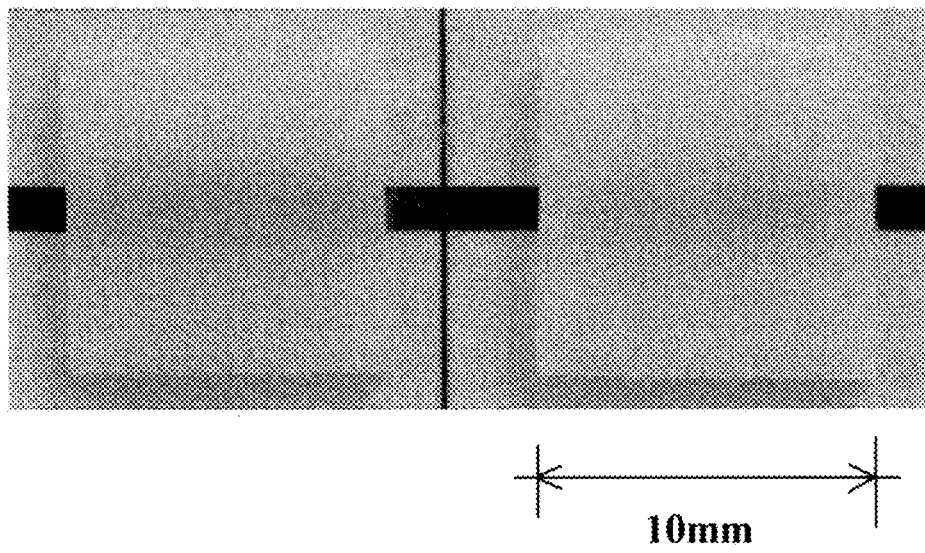
FIG. 2 is a photograph showing the appearance of zirconia sintered bodies in relation to determination of a suitable firing temperature.

Definition and Measurement of Suitable Firing Temperature of Zirconia Pre-Sintered Body In the present invention, the suitable firing temperature of a zirconia pre-sintered body is the firing temperature specified by the manufacturer when the zirconia pre-sintered body uses commercially available zirconia. In the absence of information specifying the firing temperature, the suitable firing temperature can be specified as follows. First, each zirconia pre-sintered body was fired for 120 minutes at different temperatures, and the both surfaces of the resulting zirconia sintered body were polished with #600 paper to obtain specimens each having a thickness of 0.5 mm. The specimens were visually inspected for their appearance, and the suitable firing temperature of each zirconia pre-sintered body was determined according to the following criteria with reference to the translucency of the specimens. The zirconia pre-sintered body can be determined as having been sufficiently fired when it is clear enough to show the background, as in the specimen shown on the left-hand side of FIG. 2. Firing can be determined as being insufficient when the zirconia pre sintered body is low in translucency or clouded, as in the specimen on the right-hand side of FIG. 2. In the present invention, the lowest temperature at which the zirconia pre sintered body can be regarded as having been sufficiently fired as in the specimen on the left-hand side of FIG. 2 was determined as the suitable firing temperature of the zirconia pre sintered body. When the zirconia pre-sintered body has a plurality of layers with different yttria contents, the suitable firing temperature of a layer with the highest yttria content is determined as the suitable firing temperature of the zirconia pre-sintered body.

The suitable firing temperatures of the zirconia pre sintered bodies used in Examples and Comparative Examples were found to be as follows by the above-described measurement: 1,550° C. in Examples 1 to 5 and Comparative Example 1, and 1,500° C. in Comparative Example 2. For the zirconia pre-sintered body of Comparative Example 3 fabricated using Zpex® and Zpex® Smile manufactured by Tosoh Corporation, the firing temperature of 1,450° C. is specified by the manufacturer.

Measurement of Difference in Firing Shrinkage Ratio

The zirconia pre-sintered bodies of Examples and Comparative Examples were each fabricated into a zirconia sintered body in the following manner, and the difference in firing shrinkage ratio between a layer containing one end P and a layer containing the other end Q was evaluated.

Figure 3A:
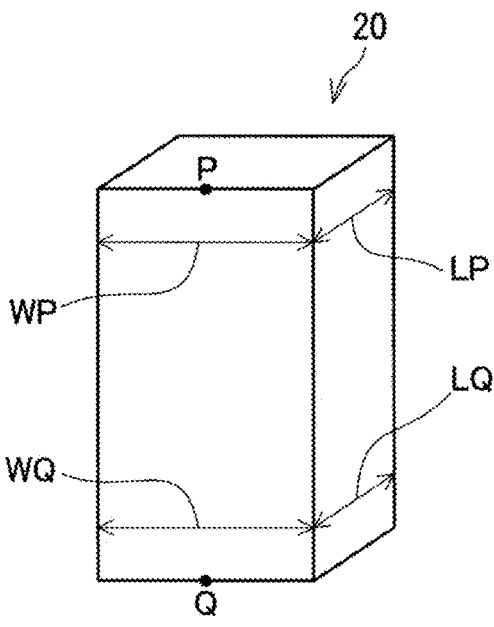
FIG. 3A is a schematic view of a sample used for shrinkage ratio measurement.
Figure 3B:
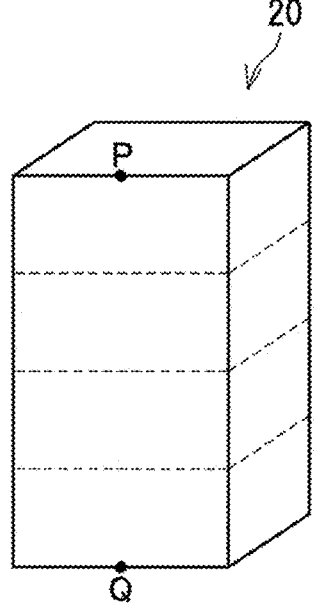
FIG. 3B is a schematic view of a zirconia pre-sintered body.

First, as shown in FIG. 3A, from each of the zirconia pre-sintered bodies 10 of Examples and Comparative Examples fabricated in the above-described manner, a zirconia pre-sintered body 20 having a cuboid shape with a cross section of 8 mm×10 mm and elongated in the direction of lamination was cut out, and the lengths of the long side WP and the short side LP of the layer containing one end P and the lengths of the long side WQ and the short side LQ of the layer containing the other end Q were measured.

The zirconia pre sintered body 20 thus cut out was fabricated into a zirconia sintered body by firing at the suitable firing temperature for 120 minutes or 15 minutes. Both the 120-minute firing and the 15-minute firing were performed using the same rate of temperature increase and the same rate of temperature decrease.

Also for the thus-obtained sintered body, the lengths of the long side WP and the short side LP of the layer containing one end P and the lengths of the long side WQ and short side LQ of the layer containing the other end Q were measured. The difference in firing shrinkage ratio was calculated using the mathematical expressions below. The results of the evaluation are presented in Table 1. The difference in firing shrinkage ratio is expressed in absolute value.

[Math. 4]

$$(\text{Shrinkage ratio of layer containing one end } P) = \frac{\dfrac{(\text{Length } WP \text{ of sintered body})}{(\text{Length } WP \text{ of pre-sintered body})} + \dfrac{(\text{Length } LP \text{ of sintered body})}{(\text{Length } LP \text{ of pre-sintered body})}}{2} \times 100$$

$$(\text{Shrinkage ratio of layer containing the other end } Q) = \frac{\dfrac{(\text{Length } WQ \text{ of sintered body})}{(\text{Length } WQ \text{ of pre-sintered body})} + \dfrac{(\text{Length } LQ \text{ of sintered body})}{(\text{Length } LPQ \text{ of pre-sintered body})}}{2} \times 100$$

$$(\text{Difference in firing shrinkage ratio}) = |(\text{Shrinkage ratio of layer containing one end } P) - (\text{Shrinkage ratio of layer containing the other end } Q)|$$

As can be seen in Table 1, the difference in firing shrinkage ratio was within 0.5% in Examples 1 to 5. These results demonstrate that the zirconia pre-sintered bodies of Examples 1 to 5 can be fabricated into dental prostheses without causing deformation or cracking. In particular, the difference in firing shrinkage ratio was within 0.1% in Examples 1 and 2. This suggests that the zirconia pre-sintered bodies of Examples 1 and 2 can be fabricated into dental prostheses with very little deformation, and the resulting dental prostheses thus exhibit excellent compatibility with an abutment tooth. The difference in firing shrinkage ratio presented in Table 1 for Examples 2 to 5 indicates the difference in firing shrinkage ratio between the first layer and the third layer. It is to be noted that the difference in firing shrinkage ratio between the first layer and the second layer and the difference in firing shrinkage ratio between the second layer and the third layer were also within 0.5%. In contrast, the difference in firing shrinkage ratio in 15-minute firing in Comparative Example 3 was much higher than 0.5%. This result suggests that the zirconia pre-sintered body Comparative Example 3 deforms greatly when fired and thus is not applicable as a dental prosthesis.

TABLE 1

| | | | | | | Difference in firing shrinkage ratio | | |
| | | Specifications of zirconia pre-sintered body | | | | | | |
| | Layer | Yttria content | Fraction $f_m$ of monoclinic crystal system | Percentage presence $f_y$ of undissolved yttria | Suitable firing temperature | Normal firing (retained for 120 min) | Short-time firing (retained for 15 min) | Deformation |
|---|---|---|---|---|---|---|---|---|
| Ex. 1 | 1st layer | 6.0 mol% | 78% | 3.7% | 1550° C. | 0.09% | 0.06% | Excellent |
| | 2nd layer | 4.0 mol% | 91% | 2.0% | | | | |
| Ex. 2 | 1st layer | 6.0 mol% | 78% | 3.7% | 1550° C. | 0.07% | 0.10% | Excellent |
| | 2nd layer | 5.0 mol% | 85% | 3.0% | | | | |
| | 3rd layer | 4.0 mol% | 91% | 2.0% | | | | |
| Ex. 3 | 1st layer | 6.5 mol% | 75% | 3.9% | 1550° C. | 0.17% | 0.18% | Good |
| | 2nd layer | 5.0 mol% | 85% | 3.0% | | | | |
| | 3rd layer | 3.0 mol% | 92% | 1.6% | | | | |
| Ex. 4 | 1st layer | 7.0 mol% | 69% | 4.3% | 1550° C. | 0.29% | 0.37% | Good |
| | 2nd layer | 5.0 mol% | 85% | 3.0% | | | | |
| | 3rd layer | 3.0 mol% | 92% | 1.6% | | | | |
| Ex. 5 | 1st layer | 6.0 mol% | 78% | 3.7% | 1550° C. | 0.22% | 0.43% | Good |
| | 2nd layer | 4.0 mol% | 85% | 2.0% | | | | |
| | 3rd layer | 2.0 mol% | 95% | 1.0% | | | | |
| Com. Ex. 1 | Single layer | 6.0 mol% | 78% | 3.7% | 1550° C. | 0.03% | 0.02% | Excellent |
| Com. Ex. 2 | Single layer | 4.0 mol% | 91% | 2.0% | 1500° C. | 0.01% | 0.01% | Excellent |
| Com. Ex. 3 | 1st layer | 5.3 mol% | 0% | 0.0% | 1450° C. | 0.46% | 0.72% | Poor |
| | 2nd layer | 3.0 mol% | 0% | 0.0% | | | | |

Confirmation of Translucency of Zirconia Sintered Body:
(1)

The zirconia pre-sintered bodies of Examples and Comparative Examples were used to fabricate zirconia sintered bodies in the following manner. The resulting zirconia sintered bodies were visually inspected for comparative evaluation of their translucency against the appearance of a natural tooth.

First, each of the zirconia pre-sintered bodies 10 of Examples and Comparative Examples fabricated in the above-described manner was formed into a crown shape by milling with a CAD/CAM system (KATANA® CAD/CAM system, manufactured by Kuraray Noritake Dental Inc.). The zirconia pre-sintered body obtained after the milling was fabricated into a zirconia sintered body by firing at the suitable firing temperatures for 120 minutes or 15 minutes. Both the 120-minute firing and the 15-minute firing were performed using the same rate of temperature increase and the same rate of temperature decrease. The zirconia sintered bodies all had a length of about 8 mm along the direction of lamination. The zirconia sintered bodies obtained were evaluated by visual inspection according to the following evaluation criteria. The results are presented in Table 2.

Evaluation Criteria

Good: zirconia sintered bodies obtained by 120-minute firing and 15-minute firing both exhibit translucency similar to that of a natural tooth and show a gradient of gradually decreasing translucency Average: either one of zirconia sintered bodies obtained by 120-minute firing and the 15-minute firing exhibits translucency similar to that of a natural tooth and shows a gradient of gradually decreasing translucency Poor: Neither of zirconia sintered bodies obtained by 120-minute firing and the 15-minute firing shows a gradient of gradually decreasing translucency In Examples 1 to 5, the zirconia sintered bodies all showed a gradient of translucency gradually decreasing from a region corresponding to the layer containing one end P of the zirconia pre-sintered body 10 shown in FIG. 1 toward a region corresponding to the layer containing the other end Q of the zirconia pre-sintered body 10 shown in FIG. 1, and they all looked similar to a natural teeth. Moreover, concerning the retention time at the suitable firing temperature when firing the zirconia pre-sintered bodies, the 120-minute firing and the 15-minute firing yielded no significant difference in translucency. It was confirmed from these results that these zirconia pre-sintered bodies can be fabricated into dental prostheses with appropriate translucency even with a short firing time.

In contrast, in each of the zirconia sintered bodies of Comparative Examples 1 and 2, the translucency was constant from a region corresponding to the layer containing one end P of the zirconia pre-sintered body 10 shown in FIG. 1 toward a region corresponding to the layer containing the other end Q of the zirconia pre-sintered body 10 shown in FIG. 1, and they did not look similar to a natural tooth. In Comparative Example 3, the translucency produced when the retention time at the suitable firing temperature was 15 minutes was much lower than the translucency produced when the retention time at the suitable firing temperature was 120 minutes. The result suggests that the zirconia sintered body obtained with a short firing time does not exhibit translucency similar to that of a natural tooth and thus cannot be fabricated into a dental prosthesis having translucency similar to that of a natural tooth.

Confirmation of Translucency of Zirconia Sintered Body:
(2)

In order to confirm the translucency of the respective layers of the zirconia sintered bodies of Examples and Comparative Examples, the layers were each independently fabricated into a zirconia sintered body in the following manner. The zirconia sintered bodies thus fabricated were quantitatively evaluated for their translucency.

Figure 4:
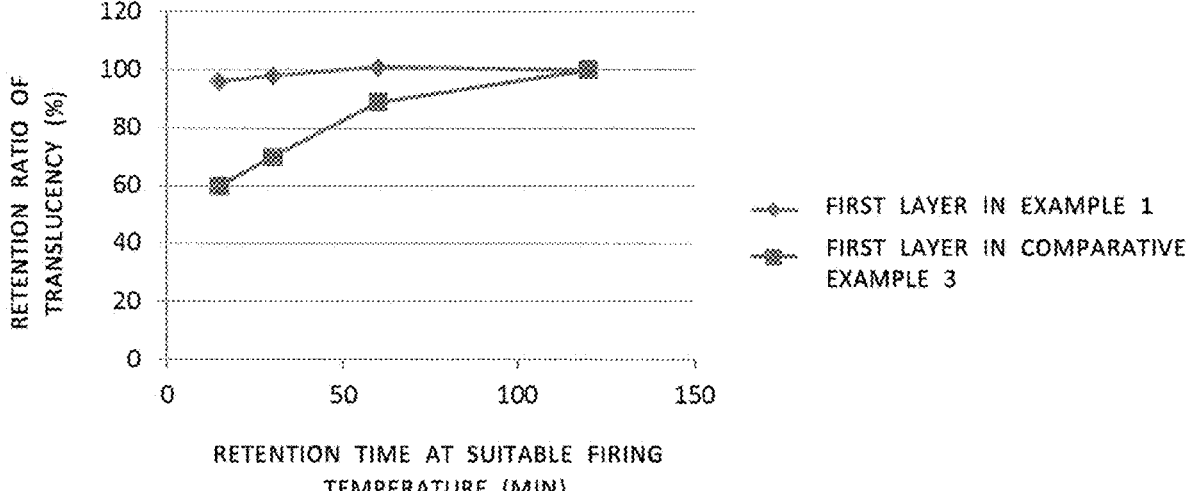
FIG. 4 is a graph representing changes in the retention ratio of translucency against retention time at a suitable firing temperature.

First, the raw material powder for forming each layer of the zirconia sintered bodies of Examples and Comparative Examples was pressed into a molded body after being adjusted in size to ensure that the zirconia sintered body produced in a later step upon polishing the both surfaces with #600 paper has a thickness of 1.2 mm. The molded body was fired at 1,000° C. for 2 hours to fabricate a zirconia pre-sintered body. The zirconia pre-sintered body was fabricated into a zirconia sintered body by firing at the suitable firing temperature for 120 minutes or 15 minutes. The both surfaces of the zirconia sintered body were polished with #600 paper, and the zirconia sintered body, 1.2 mm thick, was measured for translucency. For the first layer in Example 1 and the first layer in Comparative Example 3, zirconia sintered bodies were also fabricated with the retention time at the suitable firing temperature set to 30 minutes and 60 minutes. The translucency of each of the thus-obtained zirconia sintered bodies was measured in the following manner. The rate of temperature increase and the rate of temperature decrease were set to be the same as those in the 120-minute firing. The translucency was calculated as a ratio of a change $(\Delta L^*_x)$ in the translucency of the sintered body after firing with a retention time x (min) relative to the translucency $(\Delta L^*_{120})$ of the sintered body fired at the suitable firing temperature for 120 minutes, using the following formula. The results are presented in Tables 2 and 3 and FIG. 4.

$$\text{Retention ratio of translucency } (\%) = (\Delta L^*_x)/(\Delta L^*_{120}) \times 100$$

Measurement of Translucency $\Delta L^*$ of Zirconia Sintered Body

The translucency of each of the zirconia sintered bodies was calculated using the L* value of the luminance (color space) of the L*a*b* color system (JIS Z 8781-4:2013, Color measurements—Section 4: CIE 1976 L*a*b*color space) measured with a spectrophotometer CM-3610A (manufactured by Konica Minolta Inc.) using D65 illuminant. The specimen was measured for first L* value—an L* value measured against a white background, and second L* value—an L* value measured for the same specimen against a black background. The translucency is the value $(\Delta L^*)$ obtained by subtracting the second L* value from the first L* value.

As can be seen in Table 2, concerning each layer of the zirconia sintered bodies of Examples 1 to 5, there was no significant difference in translucency between the case where the retention time at the suitable firing temperature was 120 minutes and the case where the retention time at the suitable firing temperature was 15 minutes. All the layers in Examples 1 to 5 show the retention ratio of translucency of 96% or more. In contrast, concerning each layer of the zirconia sintered body of Comparative Example 3, the translucency produced when the retention time at the suitable firing temperature was 15 minutes is greatly different from the translucency produced when the retention time at the suitable firing temperature was 120 minutes. The layers in Comparative Example 3 show the retention ratio of translucency of 60% or less.

TABLE 2

| | Layer | Specification of zirconia pre-sintered body | | | | Confirmation (1) of translucency Visual evaluation | Confirmation (2) of Translucency ΔL* | | |
| --- | --- | --- | --- | --- | --- | --- | --- | --- | --- |
| | | Yttria content | Fraction $f_m$ of monoclinic crystal system | Percentage presence $f_y$ of undissolved yttria | Suitable firing temperature | | Normal firing (retention time: 120 min) | Short-time firing (retention time: 15 min) | Retention ratio of translucency (%) |
| Ex. 1 | 1st layer | 6.0 mol% | 78% | 3.7% | 1550° C. | Good | 16.3 | 15.7 | 96% |
| | 2nd layer | 4.0 mol% | 91% | 2.0% | | | 13.7 | 13.4 | 98% |
| Ex. 2 | 1st layer | 6.0 mol% | 78% | 3.7% | 1550° C. | Good | 16.3 | 15.7 | 96% |
| | 2nd layer | 5.0 mol% | 85% | 3.0% | | | 15.2 | 14.8 | 97% |
| | 3rd layer | 4.0 mol% | 91% | 2.0% | | | 13.7 | 13.4 | 98% |
| Ex. 3 | 1st layer | 6.5 mol% | 75% | 3.9% | 1550° C. | Good | 17.1 | 16.5 | 96% |
| | 2nd layer | 5.0 mol% | 85% | 3.0% | | | 15.2 | 14.8 | 97% |
| | 3rd layer | 3.0 mol% | 92% | 1.6% | | | 12.0 | 11.9 | 99% |
| Ex. 4 | 1st layer | 7.0 mol% | 69% | 4.3% | 1550° C. | Good | 17.5 | 17.2 | 98% |
| | 2nd layer | 5.0 mol% | 85% | 3.0% | | | 15.2 | 14.8 | 97% |
| | 3rd layer | 3.0 mol% | 92% | 1.6% | | | 12.0 | 11.9 | 99% |
| Ex. 5 | 1st layer | 6.0 mol% | 78% | 3.7% | 1550° C. | Good | 16.3 | 15.7 | 96% |
| | 2nd layer | 4.0 mol% | 85% | 2.0% | | | 13.7 | 13.4 | 98% |
| | 3rd layer | 2.0 mol% | 95% | 1.0% | | | 11.5 | 11.6 | 100% |
| Com. Ex. 1 | Single layer | 6.0 mol% | 78% | 3.7% | 1550° C. | Poor | 16.3 | 15.7 | 96% |
| Com. Ex. 2 | Single layer | 4.0 mol% | 91% | 2.0% | 1500° C. | Poor | 13.5 | 13.3 | 99% |
| Com. Ex. 3 | 1st layer | 5.3 mol% | 0% | 0.0% | 1450° C. | Average | 15.9 | 9.5 | 60% |
| | 2nd layer | 3.0 mol% | 0% | 0.0% | | | 12.8 | 6.7 | 52% |

As can be seen from Table 3, in the first layer of Comparative Example 3, the translucency decreased with decrease of the retention time at the suitable firing temperature. Specifically, the translucency values after 60 minutes, 30 minutes, and 15 minutes of firing were 89%, 70%, and 60%, respectively, of the translucency produced by 120 minutes of firing. In contrast, in the first layer of Example 1, the translucency values after firing with shorter retention times at the suitable firing temperature were not greatly different from the translucency produced by 120 minutes of firing. The translucency after 30 minutes of firing was almost 100% of the translucency produced by 120 minutes of firing, and the translucency after 15 minutes of firing was 95% or more of the translucency produced by 120 minutes of firing. As can be seen from these results, a zirconia pre-sintered body of the present invention enables firing that can be completed with a shorter firing time while maintaining high translucency. This makes it possible to more efficiently produce a zirconia sintered body, and reduce the cost of energy. Another advantage is that a zirconia pre sintered body of the present invention can be fabricated into a dental prosthesis without placing a large time burden on patients.

TABLE 3

| Retention time at suitable firing temperature (min) | | 120 min | 60 min | 30 min | 15 min |
| --- | --- | --- | --- | --- | --- |
| 1st layer in Example 1 (suitable firing temperature: 1550° C.) | Translucency | 16.3 | 16.5 | 15.9 | 15.7 |
| | Retention Ratio of translucency (%) | — | 101 | 98 | 96 |
| 1st layer in Comparative Example 3 (suitable firing temperature: 1450° C.) | Translucency | 15.9 | 14.1 | 11.2 | 9.5 |
| | Retention Ratio of translucency (%) | — | 89 | 70 | 60 |

The highest firing temperature in sintering step in each test is suitable firing temperature for each test.

Measurement of Flexural Strength of Zirconia Sintered Body

Example 1

A zirconia pre sintered body was fabricated in the above-described manner using the raw material powder of the second layer of Example 1. Thereafter, the zirconia pre sintered body was fired under the following firing conditions to obtain a zirconia sintered body. The flexural strength of the zirconia pre-sintered body was measured in compliance with ISO6872 with the size of a specimen set to 1.2 mm×4.0 mm×16.0 mm, the distance between supports (span) set to 12 mm, and the crosshead speed set to 0.5 mm/min. As a result, the flexural strength was 1,130 MPa when the retention time at the maximum firing temperature was 120 minutes and 1,090 MPa when the retention time at the maximum firing temperature was 15 minutes. The zirconia sintered bodies obtained with the retention times at the maximum firing temperature of 120 minutes and 15 minutes both exhibited a flexural strength of 1000 MPa or more, and thus have a strength required for a cervical portion of a dental prosthesis. As shown in Table 1, the translucency (ΔL*) of the first layer in Example 1 was 16.3 when the retention time at the maximum firing temperature was 120 minutes and 15.7 when the retention time at the maximum firing temperature was 15 minutes. Accordingly, they both have translucency required for a cut end portion of a dental prosthesis. That is, these results confirm that the single sintered body can have both the translucency appropriate for the cut end portion and the strength appropriate for the cervical portion.

XRD Measurement of Zirconia Pre-Sintered Body

Each zirconia pre-sintered body was examined for the crystal systems of zirconia, and for the extent of undissolution of stabilizer in zirconia as a solid solution. The results are presented in Table 2.

Figure 5:
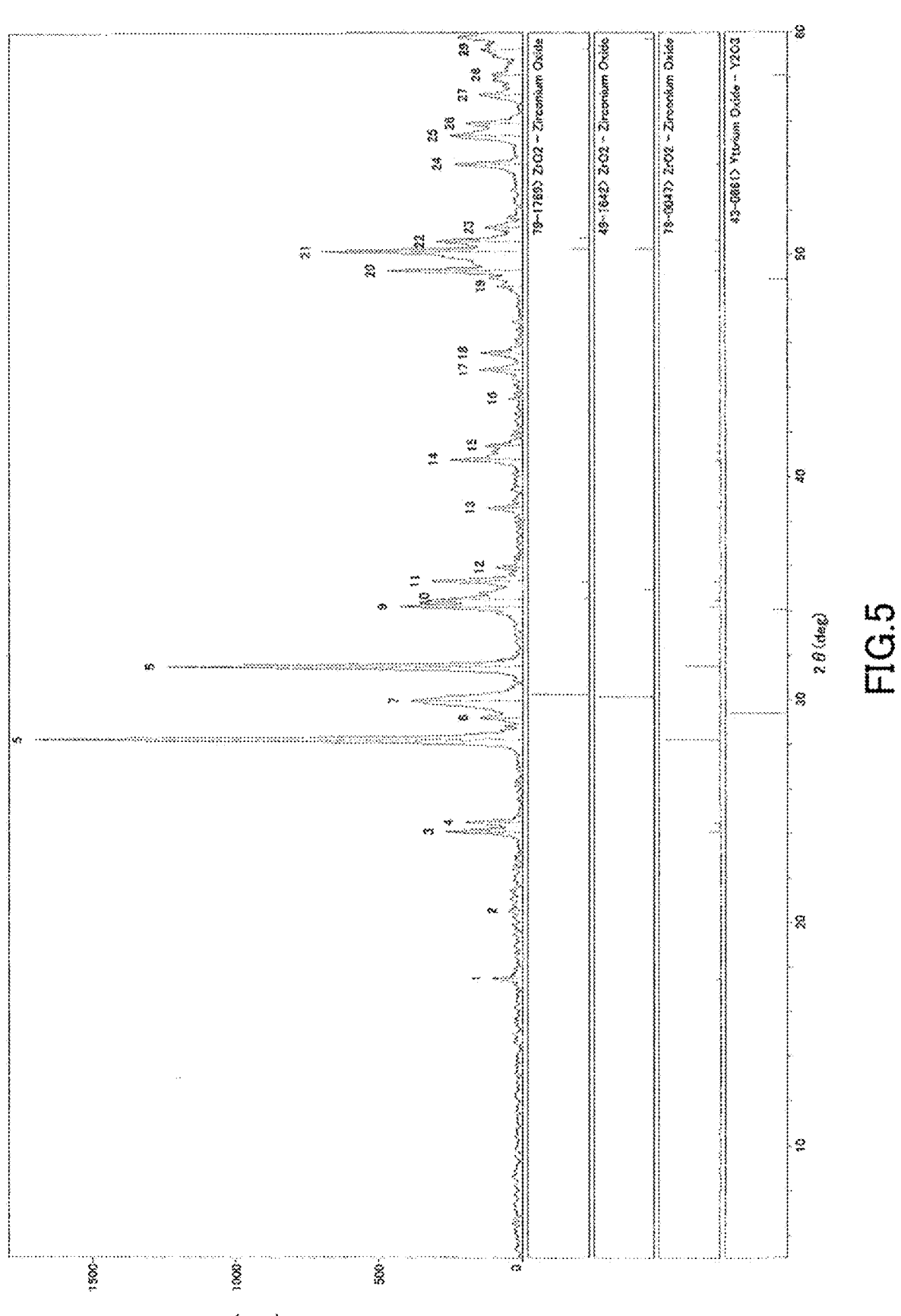
FIG. 5 shows an X-ray diffraction pattern of a pre-sintered body fabricated as a second layer in Example 1.
Figure 6:
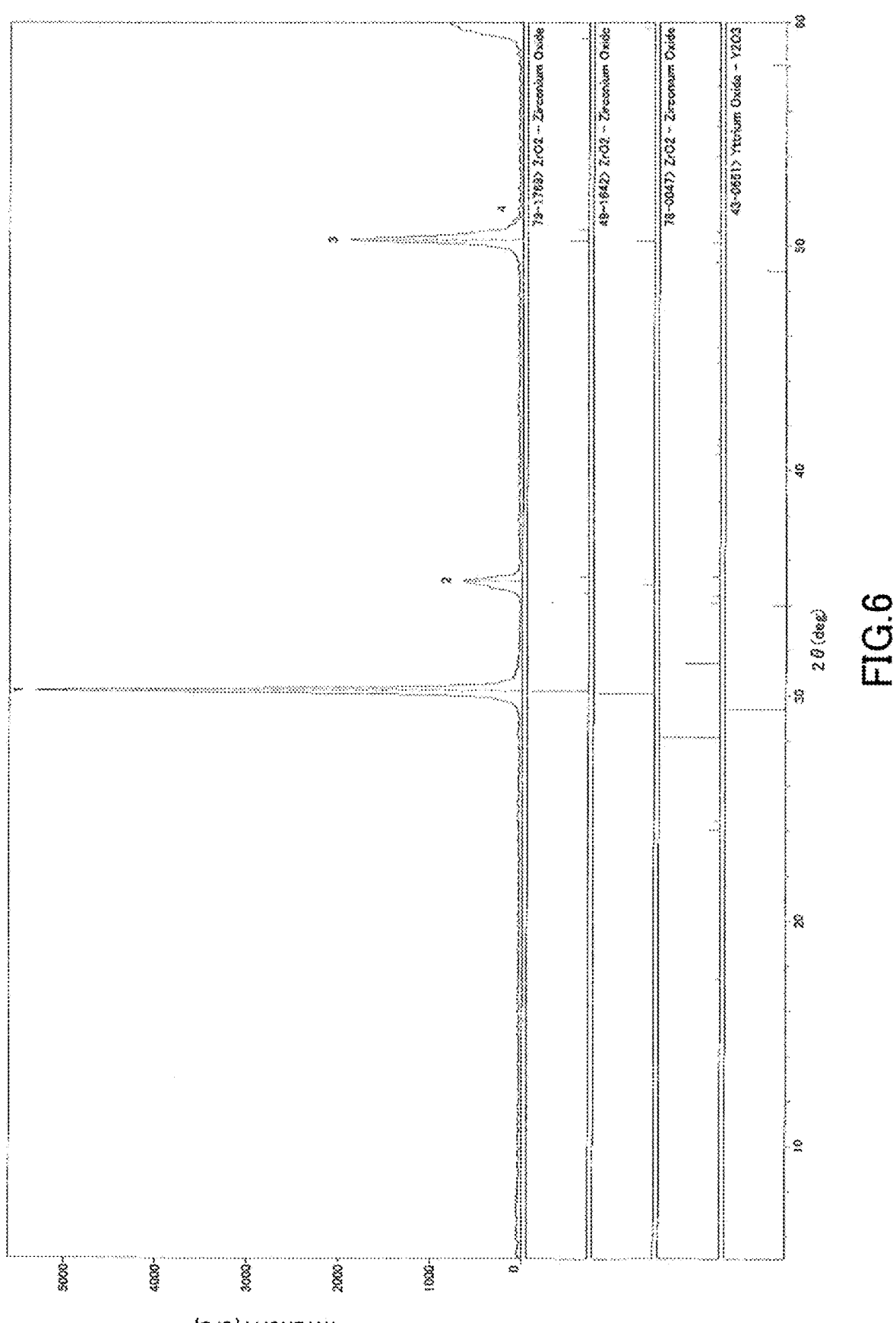
FIG. 6 shows an X-ray diffraction pattern of a pre-sintered body fabricated as a first layer in Comparative Example 3.

The XRD patterns of the zirconia pre-sintered bodies used as the respective layers in Examples 1 to 5 and Comparative Examples 1 to 3 were measured using CuKα radiation, and $f_y$ and $f_m$ were calculated. The results are presented in Tables 1 and 2. FIG. 5 shows the XRD pattern of the zirconia pre sintered body fabricated as the second layer in Example 1. FIG. 6 shows the XRD pattern of the zirconia pre-sintered body fabricated as the first layer in Comparative Example 3.

As shown in FIG. 6, the zirconia pre-sintered body used as the first layer in Comparative Example 3 showed no peak attributed to the monoclinic crystal system of zirconia. A peak attributed to yttria was also not observable. The second layer in Comparative Example 3 yielded the same result. In contrast, as shown in FIG. 5, the zirconia pre-sintered body used as the second layer in Example 1 showed peaks attributed to the monoclinic, tetragonal, and cubic crystal systems of zirconia, and the peak intensity was the highest for the monoclinic crystal system. The same results were obtained in Examples other than Example 1. The zirconia pre-sintered bodies of Examples all had peaks attributed to yttria in the vicinity of $2\theta=29.4°$ (peak number 6 in FIG. 5), suggesting that a part of yttria was not dissolved in zirconia as a solid solution in these zirconia pre-sintered bodies.

The numeric ranges given in this specification should be construed such that all numerical values and ranges falling within the ranges specified herein are specifically recited in the specification, even in the absence of specific recitations.

INDUSTRIAL APPLICABILITY

A zirconia pre-sintered body of the present invention and a sintered body thereof can be used as dental products such as prostheses.

REFERENCE SIGNS LIST

10 Zirconia pre-sintered body.
P One end
Q The other end
L Entire length
10 Y First direction
20 Sample for measurement of firing shrinkage ratio (zirconia pre sintered body)
WP Long side of layer containing one end P
LP Short side of layer containing one end P
WQ Long side of layer containing the other end Q
LQ Short side of layer containing the other end Q

The invention claimed is:
1. A zirconia pre-sintered body comprising:
zirconia; and
a stabilizer capable of inhibiting a phase transformation of zirconia,
wherein the zirconia predominantly comprises a monoclinic crystal system,
wherein the zirconia pre-sintered body comprises a plurality of layers that differ from each other in a content of the stabilizer relative to a total mol % of the zirconia and the stabilizer,
wherein the stabilizer is yttria,
wherein the zirconia pre-sintered body has a fraction $f_y$ of more than 0% as calculated from mathematical expression (1):

$$f_y(\%) = \frac{I_y(111)}{I_y(111) + I_m(111) + I_m(11-1) + I_t(111) + I_c(111)} \times 100 \quad (1)$$

where $I_y$ (111) represents a peak intensity of a (111) plane of the yttria about $2\theta=29°$ in an X-ray diffraction pattern using CuK$\alpha$ radiation,
$I_m$ (111) and $I_m$ (11-1) represent peak intensities of (111) plane and (11-1) plane, respectively, of the monoclinic crystal system of the zirconia in the X-ray diffraction pattern,
$I_t$ (111) represents a peak intensity of a (111) plane of a tetragonal crystal system of the zirconia in the X-ray diffraction pattern, and
$I_c$ (111) represents a peak intensity of a (111) plane of a cubic crystal system of the zirconia in the X-ray diffraction pattern, and
wherein the fraction $f_y$ is 13% or less, and
wherein, on a straight line extending along a first direction from one end to another end of the zirconia pre-sintered body, a content of the yttria relative to a total mol % of the zirconia and the yttria shows unchanging patterns of increase and decrease from the one end toward the other end, and a layer containing the one end has a fraction $f_y$ of 1% or more and a layer containing the other end has a fraction $f_y$ of 0.5% or more.
2. The zirconia pre-sintered body according to claim 1, wherein the monoclinic crystal system accounts for at least 55% of the zirconia.
3. The zirconia pre-sintered body according to claim 1, wherein the monoclinic crystal system accounts for at least 75% of the zirconia.
4. The zirconia pre-sintered body according to claim 1, wherein at least a part of the stabilizer is undissolved in the zirconia as a solid solution.
5. The zirconia pre-sintered body according to claim 1, wherein, on a straight line extending along a first direction from one end to another end of the zirconia pre-sintered body, the content of the stabilizer relative to the total mol % of the zirconia and the stabilizer shows unchanging patterns of increase and decrease from the one end toward the other end.
6. The zirconia pre-sintered body according to claim 1, wherein, on a straight line extending along a first direction from one end to another end of the zirconia pre-sintered body, a content of the yttria relative to a total mol % of the zirconia and the yttria shows unchanging patterns of increase and decrease from the one end toward the other end,
the content of the yttria relative to the total mol % of the zirconia and the yttria in a layer containing the one end is 4.5 mol % or more and 7.0 mol % or less, and
the content of the yttria relative to the total mol % of the zirconia and the yttria in a layer containing the other end is 2.0 mol % or more and less than 4.5 mol %.
7. The zirconia pre-sintered body according to claim 1, wherein, on a straight line extending along a first direction from one end to another end of the zirconia pre-sintered body, a content of the yttria relative to a total mol % of the zirconia and the yttria shows unchanging patterns of increase and decrease from the one end toward the other end, and
a difference in the content of the yttria relative to the total mol % of the zirconia and the yttria between a layer containing the one end and a layer containing the other end is 4.0 mol % or less.
8. The zirconia pre-sintered body according to claim 1, wherein the zirconia pre-sintered body has an X-ray diffraction pattern with an yttria peak.

9. The zirconia pre-sintered body according to claim 1, wherein a first sintered body fabricated by firing the zirconia pre-sintered body at a suitable firing temperature for 30 minutes has a first translucency that is at least 85% of a second translucency of a second sintered body fabricated by firing the zirconia pre-sintered body at the suitable firing temperature for 120 minutes.

10. The zirconia pre-sintered body according to claim 1, wherein a first sintered body fabricated by firing the zirconia pre-sintered body at a suitable firing temperature for 15 minutes has a first translucency that is at least 85% of a second translucency of a second sintered body fabricated by firing the zirconia pre-sintered body at the suitable firing temperature for 120 minutes.

11. The zirconia pre-sintered body according to claim 1, wherein the zirconia pre-sintered body has a difference in firing shrinkage ratio of 0.5% or less.

12. The zirconia pre-sintered body according to claim 1, wherein the zirconia pre-sintered body has a difference in firing shrinkage ratio of 0.43% or less.

13. A method for producing the zirconia pre-sintered body of claim 1, comprising:

pre-sintering at 800° C. to 1,200° C. a zirconia molded body formed from a raw material powder comprising zirconia particles and a stabilizer.

14. A method for producing a zirconia sintered body, the method comprising:

firing the zirconia pre-sintered body of claim 1 at a maximum firing temperature of 1,400° C. to 1,600° C.

15. The method according to claim 14, wherein the zirconia pre-sintered body is retained at the maximum firing temperature for less than 120 minutes.

16. A method for producing a dental product, the method comprising:

sintering the zirconia pre-sintered body of claim 1 after milling the zirconia pre-sintered body.

17. The method according to claim 16, wherein the milling is performed using a CAD/CAM system.

\* \* \* \* \*